United States Patent
Davila et al.

(10) Patent No.: US 6,488,979 B1
(45) Date of Patent: Dec. 3, 2002

(54) METHOD OF MAKING HEAT-RESISTANT CHOCOLATE AND CHOCOLATE-LIKE COMPOSITIONS WITH REDUCED APPARENT VISCOSITY

(76) Inventors: Victor R. Davila, 28 E. Hanover Ave., Morris Plains, NJ (US) 07950; Gilbert Finkel, 28 E. Hanover Ave., Morris Plains, NJ (US) 07950

( * ) Notice: Subject to any disclaimer, the term of this patent is extended or adjusted under 35 U.S.C. 154(b) by 0 days.

(21) Appl. No.: 09/719,915
(22) PCT Filed: Jun. 16, 1999
(86) PCT No.: PCT/US99/13543
§ 371 (c)(1), (2), (4) Date: Dec. 15, 2000
(87) PCT Pub. No.: WO99/65323
PCT Pub. Date: Dec. 23, 1999

Related U.S. Application Data
(60) Provisional application No. 60/089,437, filed on Jun. 16, 1998.
(51) Int. Cl.[7] .................................................. A23G 1/00
(52) U.S. Cl. ........................ 426/631; 426/548; 426/660
(58) Field of Search ................................ 426/548, 631, 426/660

(56) References Cited

U.S. PATENT DOCUMENTS

| | | |
|---|---|---|
| 2,166,806 A | 7/1939 | Du Pois et al. |
| 2,904,438 A | 9/1959 | O'Rourke |
| 4,045,583 A | 8/1977 | Jeffery et al. |
| 4,081,559 A | 3/1978 | Jeffery et al. |
| 4,446,166 A | 5/1984 | Giddey et al. |
| 4,664,927 A | 5/1987 | Finkel |
| 4,812,318 A | 3/1989 | Finkel |
| 4,980,192 A | 12/1990 | Finkel |
| 5,149,560 A | 9/1992 | Kealey et al. |
| 5,360,621 A * | 11/1994 | Mentink |
| 5,425,957 A | 6/1995 | Gaim-Marsoner et al. |
| 5,445,843 A | 8/1995 | Beckett |
| 5,501,865 A | 3/1996 | Zumbe et al. |
| 5,523,110 A | 6/1996 | Mandralis et al. |
| 6,143,345 A * | 11/2000 | Gonze ........................ 426/548 |
| 6,165,540 A * | 12/2000 | Traitler |

FOREIGN PATENT DOCUMENTS

| | | |
|---|---|---|
| CH | 399 891 | 9/1965 |
| CH | 409 603 | 3/1966 |
| CH | 410 607 | 3/1966 |
| CH | 489 211 | 4/1970 |
| EP | 0 459 777 A1 | 12/1991 |

* cited by examiner

Primary Examiner—Carolyn Paden
(74) Attorney, Agent, or Firm—Norman E. Lehrer

(57) ABSTRACT

A heat-resistant chocolate or chocolate-like composition is prepared by mixing a polyol, such as sorbitol or glycerine, with a flowable chocolate or chocolate-like composition through an increased apparent viscosity phase. Upon continued mixing, the mixture returns to a reduced apparent viscosity (fluid) phase. The mixture is subsequently handled in the same manner as an unmodified composition. Upon aging and stabilization, the modified chocolate or chocolate-like composition demonstrates a reduced tendency to deform at elevated temperature, is less prone to stick to packaging or fingers, and maintains the desired flavor, texture, mouth feel, and other characteristics of ordinary chocolate. The heat-resistant chocolate or chocolate-like composition of the invention is suitable for use in the same manner and for the same purposes for which ordinary chocolate and chocolate-like compositions are used, with the additional benefit of heat-resistance.

6 Claims, No Drawings

METHOD OF MAKING HEAT-RESISTANT CHOCOLATE AND CHOCOLATE-LIKE COMPOSITIONS WITH REDUCED APPARENT VISCOSITY

CROSS-REFERENCE TO RELATED APPLICATION

This application is the National Stage of International Application No. PCT/US99/13543 and claims the benefit of U.S. Provisional Patent Application Serial No. 60/089,437, filed Jun. 16, 1998.

BACKGROUND ART

The present invention is directed toward a method of forming a heat-resistant chocolate or chocolate-like composition and more particularly, toward modified products that demonstrate reduced apparent viscosity in the molten phase. As a result of this reduced apparent viscosity, these products may be handled in the same manner as unmodified compositions. Such products have a reduced tendency to melt or to deform at elevated temperatures and have a tendency to stick to fingers or packing materials.

Chocolate products are typically mixtures of liquid cocoa, cocoa butter, sugar, lecithin, and possibly milk and flavoring substances. Chocolate-like products contain substantially the same ingredients as a chocolate composition and also use any number of vegetable fats, cocoa butter replacers and/or extenders. Since the resulting fat content of these products is relatively high, the corresponding melting point is a function of the melting point of the fat contained therein.

Ordinary chocolate and chocolate-like products characteristically tend to melt at temperatures as low as 30° C. As a result, chocolate candies, and chocolate-like coatings for biscuits, cookies, and confections quickly lose their original appearance, and are no longer suitable for consumption when they have been exposed to high temperatures.

Many processes have been proposed to avoid some of the disadvantages normally associated with ordinary chocolate products. The products obtained by these various methods, which may have more heat-resistance than their ordinary counterparts, often have an unpleasant taste or texture ("mouth feel"), are expensive to produce commercially, require the production of separate ingredients, cannot be produced within established manufacturing processes, or are beyond the current legal definition for chocolate.

U.S. Pat. No. 2,166,806 discloses a product and method for preventing the separation of oils, specifically in peanut products, so that such peanut products, for example, peanut butter, will have a reduced tendency to segregate. This patent describes the addition of glycerine, a polyol, to the peanut product, in an amount upward of one-tenth of one percent, and as high as twenty percent. However, the products and processes disclosed in this patent apply only to peanut products. The potential uses with chocolate and chocolate-like compositions are not addressed. It must be noted that the fat in peanuts is substantially liquid at ordinary temperature (20° C.) and, therefore, has no bearing on or any reference to melting. A disadvantage to this process is that the peanut product to be modified thickens rapidly and allows little time for further use of the product. Also, additional equipment is needed to incorporate the glycerine at the latest possible time before further processing to prevent premature setting. Furthermore, the elevation of viscosity and yield value of the modified peanut product and its impact on the product's commercial production are not addressed.

European Patent No. 459,777 discloses a structured fat emulsion for incorporation into a confectionery coating as the fat ingredient. A disadvantage involved with this process for producing a confectionery coating containing a structured fat emulsion is that the emulsions described are inherently unstable and are therefore difficult and expensive to produce and store. Furthermore, the machinery required to produce the emulsion is alien to chocolate manufacture, thus significant additional capital investment would be required. Another disadvantage is that the preferred fat is partially hydrogenated fat. Such fats are thought to engender physiological properties that are currently thought to be undesirable, and are, therefore, less commercially desirable. Additionally, the use of such fats is not allowed as they are beyond the current legal definition for chocolate.

U.S. Pat. Nos. 5,149,560; 4,446,166; 4,081,559; 4,045,583; and 2,904,438 and Swiss Patent Nos. 410,607 and 409,603 demonstrate the use of water or moisture in chocolate compositions. Products produced by the methods described in these patents are prone to suffer an effect known as "sugar bloom" and initiate a progressively increased coarse mouth feel as the water evaporates and the sugar crystallizes. Other disadvantages may include: a lack of heat-resistance below the immediate surface of the chocolate, the need for expensive thermal treatments, controlled humidity and difficult and costly storage conditions, and deficient quality of the finished products.

Swiss Patent Nos. 399,891 and 489,211 describe methods of incorporating amorphous sugars into a chocolate composition during manufacture. The sugars form a lattice structure that prevents collapse of the mass when the temperature exceeds the melting point of the chocolate fat. Such a structure is delicate, unstable, and difficult to incorporate in a commercial setting.

U.S. Pat. No. 4,446,166 describes a chocolate composition containing a water-in-fat emulsion which provides a product containing at least 20% of the fat in solid form. The water-in-fat mixture, however, does not remain in liquid form during processing. Also, the presence of such solid materials may result in an undesired rough texture or mouth feel.

Other methods of moisture inclusion or fat immobilization have been attempted. A disadvantage described in subsequent literature has been the elevation of chocolate viscosity and yield value that occurs as a result of the employment of these methods.

It is known that Newtonian liquids (e.g., water) flow as soon as force is applied. Viscosity remains constant regardless of the rate of shear. Viscosity refers to the measure of the internal friction of a fluid that provides resistance to shear (motion) when a fluid is stirred or poured. The greater the forces of internal friction (i.e. the greater the viscosity), the less easily the fluid will flow.

Non-Newtonian liquids are liquids whose viscosities vary according to the rate at which they are stirred (also known as "shear rate"). They include plastic, dilatant, and pseudoplastic liquids, characterized by the way a fluid's viscosity changes in response to variations in shear rate.

1. Plastic. This type of fluid will behave as a solid under static conditions. Prior to the inducement of any flow, a minimum force is required to start the liquid moving.
2. Dilatant. The viscosity increases with an increasing shear rate.
3. Pseudoplastic. The viscosity decreases with an increasing shear rate.

Yield value is the minimum force required to start a non-Newtonian liquid moving. When the yield value upon a non-Newtonian liquid is achieved and exceeded, fluidity results. The higher the yield value, the more resistant the material is to flow. "Plastic Viscosity" is a measurement relating to the amount of energy required to keep certain non-Newtonian liquids moving once they have started to move.

Molten chocolate is a non-Newtonian fluid, but is typically referred to as a pseudoplastic fluid, demonstrating unique rheological characteristics. Viscosity measurements of chocolate in the molten state may be referred to as "apparent viscosity", as variations of shear rate will affect the measured viscosity. Typically, apparent viscosity is a function of applied shear rate and shear stress without regard to yield value. See, Nelson and Beckett, *Industrial Chocolate Manufacture and Use*, 1988; *Instruments and Control Systems*. vol. 32, No. 6, June 1959; and "More Solutions to Sticky Problems", Brookfiled Engineering Laboratories, Inc., 1985.

U.S. Pat. No. 4,464,927 discloses a method for increasing the viscosity of a chocolate composition so that the composition will be non-flowable at temperatures well above the normal melting point of the cocoa butter (or in the case of imitation chocolates, the melting point of vegetable fats and the like). This patent describes adding a liquid polyol, for example, glycerine, sorbitol, or mannitol of 0.2 to 5.0 wt % to a chocolate composition after tempering. A perceived disadvantage of this process is that the chocolate product to be modified sets rapidly, i.e., between 15 to 60 seconds, and allows little time for further processing of the chocolate, for example, molding or enrobing. Another disadvantage of this method is that special additional equipment may be needed to incorporate the polyol at the latest possible time before further processing of the chocolate to prevent premature setting of the chocolate.

U.S. Pat. No. 5,523,110 discloses a heat-resistant chocolate which comprises mixing of a polyol gel in particulate form with a flowable chocolate or a flowable mixture of ingredients for preparing chocolate and chocolate-like compositions. The polyol gel is formed by the use of gelling agents such as pectin, xanthan gum, locust bean gum, kappa-carrageenan agar, sodium alginate, gelatin, and iota-carrageenan. Other gelling agents, such as polysaccharides, for example, glucomannan, are suggested for use to form a firm gel around a polyol. A disadvantage of this method is that such gelling agents are not permitted in chocolate by regulation in many countries, and therefore such compositions may not labeled as "chocolate."

U.S. Pat. No. 5,523,110 also provides a gelation method by which a dry polyol mixture containing up to 95% by weight of water is used. A disadvantage of this method and process is that the product produced may have an undesirable taste and/or texture ("mouth feel") due to the presence of a high amount of water in the chocolate. In addition, the patent further provides a method for forming and dispersing a particulate polyol gel by ". . . freezing the polyol gel from about −170 C. to −200 C. and then grinding it in a cold grinder . . . " A disadvantage of this method and process is the cost prohibitive use of refrigerants such as liquid nitrogen needed to achieve low temperatures. Such a technique is alien to commercial chocolate production.

U.S. Pat. No. 5,445,843 discloses a process for improving the heat resistance of chocolate or chocolate-type products with a reduced tendency to deform at elevated temperatures including the step of mixing a polyol encapsulated within an edible lipid, for example, fat or oil, and added in particulate form to a flowable chocolate composition. The resultant chocolate product is described as having a slower "setting time" when compared to other methods. A disadvantage of this process is that in a commercial setting, it may be difficult to maintain the required "gentle mixing" of the composition. That is, pumps, mixers, and other operations in a commercial chocolate production setting may apply more mechanical energy than allowed by this patent.

Furthermore, commercial chocolate is best stored at about 40° C. See, R. B. Nelson and S. Beckett, *Industrial Chocolate Manufacture and Use* (1988). In addition, commercial chocolate is typically melted to 60° C.; lowered to between 46 and 49° C.; and pumped at a temperature between 43.5 and 49° C. prior to tempering. See, D. Hawk, et al., National Confectioner's Association—All Candy Expo educational session "Chocolate Handling, Problems and Solutions," (Jun. 12, 1997). Handling of modified chocolate beyond the parameters set by U.S. Pat. No. 5,445,843 may cause premature setting of the modified chocolate and, in a commercial setting, may result in disastrous consequences. Other disadvantages of this process are that the encapsulated particulate must be produced as a separate ingredient, and the particulate must be stored so as to remain in a solid form during the mixing and processing of the chocolate composition to prevent a premature setting.

U.S. Pat. No. 5,445,843 provides the following example:
"5 parts of the encapsulated glycerol as prepared . . . are mixed with 100 parts of a flowable mixture of conched chocolate at 30 degrees C. for 15 minutes. The chocolate remains flowable for several minutes without setting . . . "

It is well known to those skilled in the art that molten chocolate in a commercial setting must remain flowable for many hours.

It has been described and demonstrated in the prior art discussed above that the increase in viscosity of a chocolate composition by polyol or water inclusion would render certain methods impractical or unusable in a commercial setting. The prior art teaches that chocolate and imitation chocolate compositions which exhibit high viscosity in their fluid phases are to be avoided. It is also self-evident to those skilled in the art that a method to produce heat-resistant chocolate compositions considered typical to chocolate manufacturing would be preferred over the use of special processing equipment. Furthermore, special handling of ingredients and/or finished products, for example, high humidity or low temperature storage is not a preferred approach.

DISCLOSURE OF THE INVENTION

The present invention is designed to overcome the deficiencies of the prior art discussed above. It is an object of the present invention to provide a modified chocolate or chocolate-like composition with reduced apparent viscosity in the molten state, which has the taste, texture, and mouth feel of traditional chocolate or chocolate-like compositions.

It is a further object of this invention to provide a method for manufacturing a heat-resistant chocolate or chocolate-like composition that is little or no more complicated than the traditional method of manufacturing chocolate.

The present invention involves a method of adding a polyol to a flowable chocolate or chocolate-like composition. The elevation of viscosity normally associated with the introduction of the polyol is overcome by continued mixing of the composition through a stage of high apparent viscosity until the composition returns to a reduced apparent viscosity and flowable state.

These and other objects, features and advantages of the present invention will be clearly understood through a consideration of the following detailed description.

BEST MODE FOR CARRYING OUT THE INVENTION

In accordance with the present invention, 0.5 to 20-wt. % of a liquid polyol, for example, glycerine, is added to a flowable chocolate or chocolate-like mixture before or after the mixture is tempered. The liquid polyol is mixed with the chocolate or chocolate-like composition at normal processing temperatures, for example approximately 100° F. The composition is mixed through a phase of increased yield value and apparent viscosity, exhibiting reduced-flow characteristics, e.g., a "plastic phase," for a time, until the composition has returned to a flowable composition. The viscosity of the modified composition exhibits increased yield value. However, the apparent viscosity is substantially the same as or lower than the unmodified composition. The modified composition is handled in substantially the same manner as an unmodified composition, and may remain flowable for between several hours and several days.

After such a modified composition is produced and held for a time, the composition will demonstrate improved heat-resistance. (The term "reduced apparent viscosity" refers to the viscosity of the composition when it has been modified yet is still in its molten state as compared to an unmodified composition.) Upon returning to the flowable state, the modified chocolate or chocolate-like composition may be tempered, deposited, molded, or used as a coating, and when allowed to age and stabilize, develops heat resistance. The modified chocolate composition has an extended "working time" of a length sufficient for subsequent handling in the same manner as traditional chocolate. In addition, the modified chocolate composition may be produced without the costly methods and ingredients described in the prior art.

In carrying out the process of the present invention, the chocolate composition which is to be modified may be a milk chocolate, a semi-sweet chocolate, a white chocolate, or any composition known as a "compound," "confectionery," or "pastel" coating. The coating may contain any edible fat or oil. Ordinarily, the fats used are animal or vegetable in origin and are edible. However, synthetic materials having substantially similar chemical compositions to fats and oils may also be used. The preferred fats and oils are lower melting point fats that exhibit some tendency to flow at ambient or slightly elevated temperatures. This includes cocoa butter, other butter products, peanut oil, and vegetable oils. However, substantially any fat or oil can be converted into a product and rendered useable, i.e., mixed through to a flowable state by using the method of the present invention.

In a preferred embodiment, the invention is particularly applicable to products containing low melting point fats or oils, for example, chocolate or imitation chocolate products. Polyols that may be used are straight or branched-chained hydrocarbon compounds containing at least two hydroxyl groups on the carbon skeleton. Compounds which include other functional groups, for example, double bonds or carboxyl groups, may also be used, provided that at least two hydroxyl groups are present. There is no upper limit to the number of carbon atoms or hydroxyl groups that may be present on the structure.

Polyols are not generally soluble in fats or oils, and as a result, those that occur naturally as liquid are preferred. Glycerine, for example, is preferred as a matter of convenience, although other polyol materials that readily form solutions having a substantial concentration of the polyol are acceptable, for example, sorbitol. Other materials that can be utilized in the invention include mannitol and corn syrup, for example, 42 D.E., 55 D.E.

Continued mixing may be carried out during chocolate making or after chocolate making. If mixing occurs after chocolate making, it may be before tempering, after tempering, or during tempering of the chocolate. Continued mixing may be low shear, such as in a planetary mixer, or high shear, such as in a scraped surface heat exchanger. Continued mixing may be carried out at low speed or high speed.

In the production of modified chocolate and chocolate-like compositions, any conventional chocolate or chocolate-like formulation may be employed. Such formulations normally include chocolate liquor, milk solids, sugar, cocoa butter, cocoa butter replacers, lecithin, and flavors. Other ingredients, all of which are known by those skilled in the art, may also be used. Typically, the ingredients used to make a chocolate or chocolate-like composition are mixed, refined, conched, and standardized as to viscosity, tempered, and utilized to form a finished product or to enrobe or coat a pre-formed center. The finished product is then typically cooled or refrigerated after it is put into its final form.

The invention will further be understood through the following illustrative, non-restrictive examples.

EXAMPLE 1

A 600-gram sample of a commercially available milk chocolate (Cashmere Brand Milk Chocolate, Wilbur Chocolate, Litiz, Pa.) was placed into a five quart Hobart mixer, and was melted at approximately 47° C. Five percent of glycerine was added and mixing continued. Within approximately 45 seconds, the sample became highly viscous. Mixing continued, and within 20 minutes, the sample had once again become flowable. The sample was then tempered and molded in the traditional manner. Within 24 hours, the sample became heat-resistant.

EXAMPLE 2

A 600-gram sample of the same flowable chocolate from Example 1 was placed into a five quart Hobart mixer where it was melted at approximately 47° C. Five percent of glycerine was added, and the sample was returned to mixing. Once the sample had been returned to a fluid state, the mixer was then set to a low mixing speed and left on for approximately thirty (30) hours. The sample was then tempered, molded, and cooled in the traditional manner. The sample became heat resistant after three days.

EXAMPLE 3

A 20 kilogram sample of a commercially available milk chocolate (Sable Brand Milk Chocolate, Wilbur Chocolate, Litiz, Pa.) was placed into an 80 quart Hobart mixer and was melted at approximately 47° C. The chocolate was then cooled to approximately 38° C. Three percent of gylcerine was added and the sample was mixed. After 15 minutes the sample became fluid. The sample was tempered, molded, and cooled in the traditional manner. The sample became heat resistant after two days.

EXAMPLE 4

A 230 kilogram sample of the same chocolate used in Example 3 was placed in a swept-surface paddle mixer and was melted at approximately 47° C. The chocolate was then cooled to approximately 38° C. Three percent of glycerine was added. The sample was then mixed. Within 30 minutes the sample became fluid and was pumped, tempered, molded, and cooled in the traditional manner. The sample became heat resistant after three days.

EXAMPLE 5

A semi-sweet chocolate was prepared to the following formula:

| Ingredient | Parts By Weight |
|---|---|
| Refined sugar | 50 |
| Chocolate liquor | 40 |
| Cocoa butter | 9.7 |
| Lecithin | 0.3 |
| Total | 100 |

The above material was mixed in a 12 quart Hobart mixer for 6 hours at 50° C. The sample was cooled to 40° C. Eight parts of a polyol was added to the composition, and the sample was mixed until the sample was again flowable. The sample was then tempered, molded, and cooled in the traditional manner. The sample became heat resistant overnight.

EXAMPLE 6

A 600-gram sample of a commercially available confectionery or "fudge" coating (Blommer Chocolate Company, Chicago, Ill.) was placed into a five quart Hobart mixer and was melted at approximately 47° C. Eight percent of a polyol was added and mixing continued. Within 45 minutes the sample became flowable. The sample was then used to enrobe graham crackers. Within 48 hours, the coated graham crackers became heat-resistant.

It will be readily apparent to those skilled in the art that a wide variety of food, cosmetic, pharmaceutical, and other compositions can be formulated utilizing the method of the invention to produce a wide variety of novel products. The present invention may be embodied in other specific forms without departing from the spirit or essential attributes thereof and accordingly, reference should be made to the appended claims rather than to the foregoing specification as indicating the scope of the invention.

What is claimed is:

1. A method for producing a heat-resistant chocolate-like composition with reduced apparent viscosity comprising the steps of:

providing a flowable chocolate-like composition;

adding 0.5 to 20-wt % of a liquid polyol to said composition to form a mixture having an increased apparent viscosity; and continuously mixing said mixture until said mixture has a reduced apparent viscosity.

2. The method for producing a heat-resistant chocolate-like composition with reduced apparent viscosity as claimed in claim 1 wherein said polyol is glycerine.

3. The method for producing a heat-resistant chocolate-like composition with reduced apparent viscosity as claimed in claim 1 further including the step of tempering said composition before said adding step.

4. The method for producing a heat-resistant chocolate-like composition with reduced apparent viscosity as claimed in claim 1 further including the step of tempering said mixture after said adding step.

5. The method for producing a heat-resistant chocolate-like composition with reduced apparent viscosity as claimed in claim 1 further including the step of tempering said composition during said adding step.

6. The method for producing a heat-resistant chocolate-like composition with reduced apparent viscosity as claimed in claim 1 wherein said chocolate-like composition is chocolate.

* * * * *